Dec. 6, 1966    K. ENKE    3,290,035
VEHICLE SPRING SYSTEM
Filed Aug. 13, 1964

INVENTOR
KURT ENKE

BY Dicke & Craig
ATTORNEYS

United States Patent Office 3,290,035
Patented Dec. 6, 1966

3,290,035
VEHICLE SPRING SYSTEM
Kurt Enke, Fellbach, Germany, assignor to Daimler-Benz Aktiengesellschaft, Stuttgart-Unterturkheim, Germany
Filed Aug. 13, 1964, Ser. No. 389,277
Claims priority, application Germany, Aug. 17, 1963, D 42,273
3 Claims. (Cl. 267—8)

The present invention relates to a spring system, and more particularly to a spring system for motor vehicles which is so constructed as to assure good springing and damping characteristics against shocks and vibrations falling within a relatively wide range of frequencies.

The spring system of a motor vehicle, by means of which the vehicle body is normally spring-supported with respect to the road surface, ordinarily consists of a main spring means, of a tire spring means and of a damping system such as a shock absorber connected in parallel with the main spring means. However, such prior art damping system operates satisfactorily and with favorable damping characteristics in general only within a certain limited frequency range. The normal shock absorber or swinging damper is satisfactory with swinging movements or vibrations slowly succeeding one another, to which the main spring means between the wheels and body is tuned or matched and which are of the order of magnitude of approximately 1 Hz.; the normal shock absorber or swinging damper also satisfies its damping task at high frequencies as occur while driving rapidly over successive obstacles, for example, approximately of the order of magnitude of 10 Hz., however, it transmits disagreeably large shocks and forces to the vehicle body.

It is also known to utilize as swinging damper a so-called relaxation damper in which a damping device and a spring which is relatively soft as compared to the usual elastic shock absorber connection and which, for example, is only about 2 to 5 times as hard as the main spring, are connected in series. Such a relaxation damper can also be tuned to a body frequency of about 1 Hz. and then dampens within this range as well as a normal damping device; however, it possesses a damping effect which decreases with increasing frequencies so that higher swinging or vibration frequencies, which lie within the range of the natural or resonant frequency of the wheel of about 10 Hz. are damped only incompletely.

The present invention aims above all to keep relatively small—with means as simple as possible—the spring forces and therewith the body accelerations both in the range of the natural or resonant frequency of the body, for example, in the range of about 1 Hz., as well as also in the range of the natural or resonant frequency of the wheel, for example, of the order of 10 Hz. The present invention essentially consists in that the main spring system in combination with a relaxation damper serving for the damping thereof and consisting of a damping device and of a relatively soft spring connected in series therewith, is combined with a vibration annihilator consisting of spring, damping device and damping mass. The long-wave vibrations or oscillations within the range of natural or resonant frequency of the body are thereby damped by the main spring system in combination with the relaxation damper whereas simultaneously therewith the vibration annihilator is able to keep the natural or resonant frequency vibrations of the wheel within tolerable limits. It is thereby possible with a corresponding matching to achieve in practice an essentially uniform swinging or vibration damping effect over the entire vibration damping range in question. The forces transmitted to the body are accordingly also considerably smaller than with the conventional spring systems customary heretofore. Simultaneously therewith, the road-force fluctuations can be kept within acceptable limits which do not exceed those of the usual systems.

Compared to servo-controlled spring systems there exists additionally the advantage with the construction in accordance with the present invention that the entire system consists of passive elements, that is, of such elements which require no external energy supply. As can be readily demonstrated by calculations, a decrease of the body acceleration within the range of the natural or resonant frequency of the wheel or with short individual obstacles can be obtained by means of the present invention without deterioration of the road-holding characteristics and of the natural or resonant frequency of the body.

The relaxation damper is preferably connected in parallel with the vibration annihilator as well as also completely or partially with the main spring system. It is thus possible to connect the spring means of the relaxation damper in series with the main spring means or to utilize a part of the main spring means as spring means for the relaxation damping device.

Accordingly, it is an object of the present invention to provide a spring system for motor vehicles which effectively eliminates the shortcomings and drawbacks encountered with the prior art constructions by simple means.

Another object of the present invention resides in the provision of a vehicle spring system which is capable of damping substantially uniformly all vibrations that may occur within the range of the natural frequencies of the body and of the wheels.

A still further object of the present invention resides in the provision of a vehicle spring system capable of effectively providing shock absorption and vibration damping characteristics for vibrations and road shocks of frequencies of the order of 1 Hz. to 10 Hz. without transmitting any disagreeable shocks or forces to the body.

Another object of the present invention resides in the provision of a vehicle spring system in which an essentially uniform swinging or vibration damping can be achieved over the entire range of vibrations and oscillations that have to be considered in connection with the design of present day motor vehicle suspension systems.

A further object of the present invention resides in the provision of a vehicle spring system that assures considerably improved driving comfort under all operating conditions without impairing roadability of the vehicle.

Still a further object of the present invention resides in the provision of a vehicle spring system for motor vehicles in which the forces transmitted to the body are kept considerably smaller than realizable heretofore.

Still another object of the present invention resides in the provision of a vehicle spring system achieving all the aforementioned purposes with the use of passive elements that require no external energy for the operation thereof.

These and other objects, features and advantages of the present invention will become more obvious from the following description when taken in connection with the accompanying drawing which shows for the purposes of illustration only, several embodiments in accordance with the present invention, and wherein FIGURE 1 is a schematic diagrammatic view of a first embodiment of a spring system in accordance with the present invention;

Figure 1:
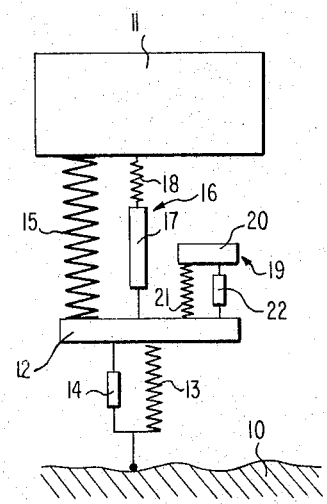

Referring now to the drawings wherein like reference numerals are used throughout the various views to designate like parts, reference numeral 10 designates in all embodiments the road surface while reference numeral 11 designates the schematically shown vehicle body and reference numeral 12 the schematically shown mass of the wheel and any parts swinging or deflecting in unison with the wheel during spring deflections thereof. The spring system consisting of the conventional spring means 13 and damping means 14, which are inherent and conventional attributes of the rubber of the tire on the vehicle wheel, is disposed between the road surface 10 and the wheel mass 12, whose natural or resonant frequency is generally within the range of about 10 Hz.

The main spring system 15 of any known construction, on the one hand, and the relaxation damper generally designated by reference numeral 16 and also of any known construction together with the damping part 17 and the damping spring 18 connected in series therewith, on the other, are connected between the wheel mass 12 inclusive any other masses swinging in unison with the wheel and the vehicle body 11. Additionally the vibration annihilator generally designated by reference numeral 19 is connected with the wheel mass 12; the vibration annihilator 19 consists of the swinging mass 20, of a spring 21 and of a damper 22, all of any known construction.

In the embodiment according to FIGURE 1, the main spring means 15 and the relaxation damper 16 inclusive its spring 18 are connected in parallel to one another.

Figure 2:
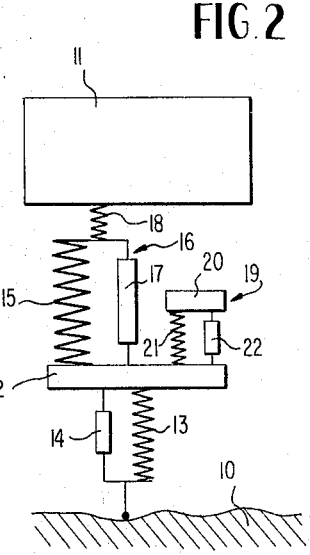
FIGURE 2 is a schematic diagrammatic view of a second embodiment of a spring system in accordance with the present invention.

In the embodiment according to FIGURE 2, in contrast thereto, the main spring means 15 is connected in parallel only with the damping part 17 of the relaxation damper 16 whereas the spring 18 of the relaxation damper 16 at the same time is also in series with the main spring 15 in such a manner that the spring 18 of the relaxation damper 16 forms directly a part of the main spring 15.

The invention is not limited to the illustrated embodiments. For example, individual parts of the relaxation damper 16 and of the vibration annihilator 19 may also be combined with one another as long as the basic operating effect of the combination of the present invention is maintained in principle. Furthermore, in addition to the relaxation damping means 16, possibly a further damping means may be provided within the main spring such as a shock absorber. Moreover, the main spring may be disposed either directly or indirectly between the wheels and the vehicle body and may include an equalization spring and/or a stabilizer or any other similar spring system.

Figure 3:
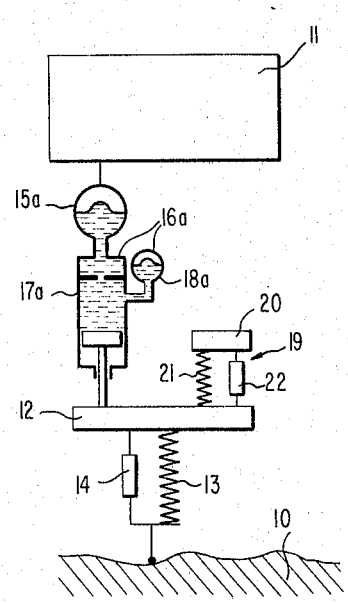
FIGURE 3 is a schematic diagrammatic view of a third modified embodiment of a spring system in accordance with the present invention.

Additionally, corresponding pneumatic or hydro-pneumatic units may be utilized instead of the usual spring and shock absorbers or damping devices. For example, FIGURE 3 illustrates a spring system which corresponds in its operation to that of FIGURE 2 and in which corresponding parts are designated by the same reference numerals as in FIGURE 2 but with the suffix a. The relaxation damping means 16a together with the damping part 17a and the additional spring 18a are connected partly in series and partly in parallel with the hydro-pneumatic spring 15a. Possibly the spring 21 of the vibration annihilator may also be replaced by a pneumatic or hydro-pneumatic spring system. Any conventional appropriate construction may be used for the schematically indicated parts which are well known in the art, per se, so that a detailed showing and description thereof is dispensed with herein. Furthermore, the various parts may be interconnected in any conventional manner, as is also well known to a person skilled in the art.

Thus, it is obvious that the present invention is not limited to the details shown and described herein but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A spring system for vehicles, especially motor vehicles, comprising:

main spring means connecting a vehicle body and supporting wheel, relaxation damping means serving for damping said main spring means and including a damping device and relatively soft spring means connected in series therewith, and vibration annihilator means operatively connected with said main spring means and including further spring means, further damping means, and a damping mass, the damping device of the relaxation damping means being connected in parallel with said main spring means, and said soft spring means of said relaxation damping means being connected in series with the main spring means.

2. A spring system for vehicles, especially motor vehicles, according to claim 1, said relaxation damping means being tuned for damping approximately 1 Hz. and the vibration annihilator means being tuned for damping at approximately 10 Hz.

3. A spring system for vehicles, especially motor vehicles, comprising:

main spring means connecting a vehicle body and supporting wheel, relaxation damping means for damping said main spring means and including two members comprising a damping device and relatively soft spring means, said members forming a series connection in which one of said members contacts said vehicle body and the other of said members is connected to said wheel, and vibration annihilator means operatively connected with said main spring means and including further spring means, further damping means, and a damping mass, at least a portion of said relaxation damping means being connected in parallel with said main spring means, said annihilator means being operatively connected in effect with at least said portion of said relaxation damping means, the spring means of the relaxation damping means being considerably stiffer than the main spring means, said relaxation damping means being operable to provide a damping effect at a frequency $f1$ and the vibration annihilator means operable to provide a damping effect at a frequency $f2$ which is approximately ten times $f1$.

References Cited by the Examiner

UNITED STATES PATENTS 2,901,239  8/1959  Sethna _____ 267—8

FOREIGN PATENTS 1,215,172  11/1959  France.

ARTHUR L. LA POINT, *Primary Examiner.*

R. M. WOHLFARTH, *Assistant Examiner.*